United States Patent
Rose et al.

(10) Patent No.: US 8,452,516 B1
(45) Date of Patent: May 28, 2013

(54) VARIABLE VANE SCHEDULING BASED ON FLIGHT CONDITIONS FOR INCLEMENT WEATHER

(75) Inventors: Becky E. Rose, Colchester, CT (US); Lisa I. Brilliant, Middletown, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 13/446,326

(22) Filed: Apr. 13, 2012

Related U.S. Application Data

(60) Provisional application No. 61/593,305, filed on Jan. 31, 2012.

(51) Int. Cl.
| | |
|---|---|
| G06F 19/00 | (2006.01) |
| G06G 7/70 | (2006.01) |
| F02C 7/05 | (2006.01) |
| B64D 33/02 | (2006.01) |
| F01D 5/14 | (2006.01) |
| F01D 5/12 | (2006.01) |
| F01D 25/00 | (2006.01) |
| F01D 13/02 | (2006.01) |
| F01D 17/00 | (2006.01) |
| F03D 11/00 | (2006.01) |
| F03B 11/00 | (2006.01) |
| F04D 29/38 | (2006.01) |
| F01B 25/00 | (2006.01) |
| F01B 25/02 | (2006.01) |

(52) U.S. Cl.
USPC ........................................................ 701/100

(58) Field of Classification Search
USPC .............. 244/12.3, 209, 23 A, 53 B; 290/1 R, 290/52; 415/115, 121.2, 145, 148, 159, 160, 415/17, 26; 60/204, 226.1, 226.3, 39.092, 60/39.24, 772, 773, 774, 776, 779, 790, 792, 60/794, 801, 804; 701/100, 14, 31.6, 7
See application file for complete search history.

(56) References Cited

U.S. PATENT DOCUMENTS

| | | | |
|---|---|---|---|
| 3,976,265 | A | 8/1976 | Doolittle |
| 3,981,466 | A | 9/1976 | Shah |
| 4,004,760 | A | 1/1977 | Ando et al. |
| 4,047,379 | A | 9/1977 | Brookes et al. |
| 4,250,703 | A | 2/1981 | Norris et al. |
| 4,308,463 | A | 12/1981 | Giras et al. |
| 4,380,146 | A | 4/1983 | Yannone et al. |

(Continued)

OTHER PUBLICATIONS

Gunston, Bill, "Jane's Aero-Engines," Issue Seven, 2000, pp. 510-512.

(Continued)

*Primary Examiner* — Fadey Jabr
*Assistant Examiner* — Kevin P Mahne
(74) *Attorney, Agent, or Firm* — Carlson, Gaskey & Olds, P.C.

(57) ABSTRACT

A method of protecting a gas turbine engine according an exemplary aspect of the present disclosure includes, among other things, the steps of determining at least one flight condition of an aircraft and comparing the at least one flight condition to a programmed condition. The method further includes the steps of moving a plurality of inlet vanes of a low pressure compressor from a first position to a second position if the step of comparing the at least one flight condition to the programmed flight condition determines the programmed flight condition are met and deflecting any foreign objects with the plurality of inlet vanes.

22 Claims, 3 Drawing Sheets

U.S. PATENT DOCUMENTS

| | | | | |
|---|---|---|---|---|
| 4,671,318 | A | 6/1987 | Benson | |
| 4,696,156 | A | 9/1987 | Burr et al. | |
| 4,711,084 | A | 12/1987 | Brockett et al. | |
| 4,720,237 | A | 1/1988 | Weiner et al. | |
| 4,741,152 | A | 5/1988 | Burr et al. | |
| 4,765,131 | A | 8/1988 | Benson | |
| 4,779,644 | A | 10/1988 | Benson | |
| 4,783,026 | A | 11/1988 | Rumford et al. | |
| 4,831,819 | A | 5/1989 | Norris et al. | |
| 4,852,343 | A | 8/1989 | Norris et al. | |
| 4,867,635 | A * | 9/1989 | Tubbs | 415/159 |
| 4,963,174 | A | 10/1990 | Payne | |
| 5,107,674 | A | 4/1992 | Wibbelsman et al. | |
| 5,123,240 | A | 6/1992 | Frost et al. | |
| 5,168,447 | A | 12/1992 | Moore | |
| 5,284,012 | A | 2/1994 | Laborie et al. | |
| 5,334,061 | A | 8/1994 | Behm et al. | |
| 5,351,476 | A | 10/1994 | Laborie et al. | |
| 5,351,478 | A | 10/1994 | Walker et al. | |
| 5,794,432 | A * | 8/1998 | Dunbar et al. | 60/204 |
| 6,109,868 | A | 8/2000 | Bulman et al. | |
| 6,119,985 | A | 9/2000 | Clapp et al. | |
| 6,142,418 | A | 11/2000 | Weber et al. | |
| 6,155,212 | A | 12/2000 | McAlister | |
| 6,244,034 | B1 | 6/2001 | Taylor et al. | |
| 6,408,641 | B1 | 6/2002 | Skur, III | |
| 6,499,285 | B1 * | 12/2002 | Snyder | 60/39.092 |
| 6,561,760 | B2 | 5/2003 | Wadia et al. | |
| 6,694,746 | B2 | 2/2004 | Reed et al. | |
| 6,758,044 | B2 * | 7/2004 | Mannarino | 60/773 |
| 6,789,000 | B1 | 9/2004 | Munson, Jr. | |
| 6,921,244 | B2 | 7/2005 | Johnson | |
| 6,941,217 | B1 | 9/2005 | Munson, Jr. | |
| 7,445,424 | B1 | 11/2008 | Ebert et al. | |
| 7,694,505 | B2 | 4/2010 | Schilling | |
| 7,802,433 | B2 | 9/2010 | Higgins | |
| 7,805,947 | B2 | 10/2010 | Moulebhar | |
| 7,862,293 | B2 | 1/2011 | Olver | |
| 7,874,137 | B2 | 1/2011 | Chaney et al. | |
| 7,984,684 | B2 | 7/2011 | Hinderks | |
| 8,016,232 | B2 | 9/2011 | Anderson et al. | |
| 2003/0035719 | A1 * | 2/2003 | Wadia et al. | 415/145 |
| 2007/0068171 | A1 * | 3/2007 | Epstein | 60/792 |
| 2008/0236133 | A1 | 10/2008 | Bart et al. | |
| 2009/0126337 | A1 | 5/2009 | Hazzard et al. | |
| 2009/0271085 | A1 * | 10/2009 | Buchalter et al. | 701/100 |
| 2010/0292905 | A1 | 11/2010 | Agrawal et al. | |
| 2011/0079015 | A1 * | 4/2011 | Geis et al. | 60/779 |
| 2011/0167792 | A1 * | 7/2011 | Johnson et al. | 60/226.3 |
| 2011/0208400 | A1 | 8/2011 | Lickfold et al. | |
| 2012/0070271 | A1 * | 3/2012 | Urban et al. | 415/145 |

OTHER PUBLICATIONS

International Search Report and Written Opinion for PCT Application No. PCT/US2013/023357 mailed Mar. 27, 2013.

* cited by examiner

VARIABLE VANE SCHEDULING BASED ON FLIGHT CONDITIONS FOR INCLEMENT WEATHER

CROSS REFERENCE TO RELATED APPLICATIONS

This application claims priority to U.S. Provisional Application No. 61/593,305 which was filed on Jan. 31, 2012.

BACKGROUND OF THE INVENTION

Gas turbine engines can have multiple low pressure compressor stages close coupled with a fan. When a geared architecture is employed in the gas turbine engine, a tip speed of a rotor of a low pressure compressor can be increased, and the stage count of the low pressure compressor can be reduced. Variable vanes may then be needed to improve operability of the low pressure compressor. Variable vanes increase operability by moving an angle of inlet air flowing into a first stage compressor to improve operation of the low pressure compressor.

An aircraft can be exposed to inclement weather that could affect the operation of the gas turbine engine. For example, the inclement weather can produce hail or ice that could affect operation.

SUMMARY OF THE INVENTION

A method of protecting a gas turbine engine according an exemplary aspect of the present disclosure includes, among other things, the steps of determining a flight condition of an aircraft and comparing the flight condition to a programmed condition. The method further includes the steps of moving a plurality of inlet vanes of a low pressure compressor from a first position to a second position if the step of comparing the flight condition to the programmed flight condition determines that the programmed flight condition are met and thus deflecting any foreign objects with the plurality of inlet vanes.

In a further non-limited embodiment of any of the forgoing method embodiments, the method may include a plurality of inlet vanes having a first position that is a non-diversion position and a second position that is a diversion position.

In a further non-limited embodiment of any of the forgoing method embodiments, the method may include a plurality of inlet vanes that move about 15° to about 50°, respectively, from the non-diversion position to the diversion position.

In a further non-limited embodiment of any of the forgoing method embodiments, the method may include a flight condition that is an altitude.

In a further non-limited embodiment of any of the forgoing method embodiments, the method may include a flight condition that is a power setting.

In a further non-limited embodiment of any of the forgoing method embodiments, the method may include flight conditions that are an altitude and a power setting.

In a further non-limited embodiment of any of the forgoing method embodiments, the method may include the steps of generating a signal in response to the step of comparing a flight condition to a programmed flight condition, and moving a plurality of inlet vanes from a first position to a second position in response to the signal.

In a further non-limited embodiment of any of the forgoing method embodiments, the method may include a programmed flight condition where an altitude is 10,000 to 25,000 feet and a power condition is idle.

In a further non-limited embodiment of any of the forgoing method embodiments, the method may include a low pressure compressor includes a plurality of rotors, a flowpath that exists between an outer diameter of the plurality of rotors and an outer casing of a gas turbine engine, and the step of deflecting any foreign objects with a plurality of inlet vanes that directs the foreign objects in the flowpath for extraction with a downstream bleed.

In a further non-limited embodiment of any of the forgoing method embodiments, the method may include foreign objects that are at least one of hail, ice or dirt.

A method of protecting another gas turbine engine according an exemplary aspect of the present disclosure includes, among other things, the steps of determining flight conditions of an aircraft, where the flight conditions are altitude and a power setting, and comparing the flight conditions to programmed flight conditions. The method also includes the steps of generating a signal in response to the step of comparing the flight conditions to the programmed flight conditions if the programmed flight conditions are met and moving a plurality of inlet vanes of a low pressure compressor from a non-diversion position to a diversion position in response to the signal. The method also includes the step of deflecting any foreign objects with the plurality of inlet vanes in a flowpath for extraction with a downstream bleed, where the flowpath is defined by an outer diameter of a plurality of rotors of the low pressure compressor and an outer casing of a gas turbine engine.

In a further non-limited embodiment of any of the forgoing method embodiments, the method may include a plurality of inlet vanes that move about 15° to about 50° from the non-diversion position to the diversion position.

In a further non-limited embodiment of any of the forgoing method embodiments, the method may include programmed flight conditions where an altitude is 10,000 to 25,000 feet and a power condition is idle.

In a further non-limited embodiment of any of the forgoing method embodiments, the method may include foreign objects that are at least one of hail, ice or dirt.

A gas turbine engine according an exemplary aspect of the present disclosure includes, among other things, a controller that determines a flight condition of an aircraft, compares the flight condition to a programmed flight condition, determines if the programmed flight condition is met, and generates a signal if the programmed flight condition is met. The gas turbine engine also includes a low pressure compressor, where the low pressure compressor includes a plurality of inlet vanes, and the plurality of inlet vanes move from a first position to a second position in response to the signal from the controller to deflect any foreign objects.

In a further non-limited embodiment of any of the forgoing gas turbine engine embodiments, the gas turbine engine may include a plurality of inlet vanes having a first position that is a non-diversion position and a second position that is a diversion position.

In a further non-limited embodiment of any of the forgoing gas turbine engine embodiments, the gas turbine engine may include a plurality of inlet vanes that move about 15° to about 50° from the non-diversion position to the diversion position.

In a further non-limited embodiment of any of the forgoing gas turbine engine embodiments, the gas turbine engine may include a flight condition that is an altitude.

In a further non-limited embodiment of any of the forgoing gas turbine engine embodiments, the gas turbine engine may include a flight condition that is a power setting.

In a further non-limited embodiment of any of the forgoing gas turbine engine embodiments, the gas turbine engine may include a flight condition that is an altitude and a power setting.

In a further non-limited embodiment of any of the forgoing gas turbine engine embodiments, the gas turbine engine may include a programmed flight condition where an altitude is 10,000 to 25,000 feet and a power condition is idle.

In a further non-limited embodiment of any of the forgoing gas turbine engine embodiments, the gas turbine engine may include a low pressure compressor includes a plurality of rotors, a flowpath that exists between an outer diameter of the plurality of rotors and an outer casing of the gas turbine engine, and the step of deflecting any foreign objects with a plurality of inlet vanes that directs the foreign objects in the flowpath for extraction with a downstream bleed.

In a further non-limited embodiment of any of the forgoing gas turbine engine embodiments, the gas turbine engine may include a downstream bleed that exits the gas turbine engine through a duct.

In a further non-limited embodiment of any of the forgoing gas turbine engine embodiments, the gas turbine engine may include an actuator that moves the plurality of variable vanes between the first position and the second position.

In a further non-limited embodiment of any of the forgoing gas turbine engine embodiments, the gas turbine engine may include foreign objects that are at least one of hail, ice or dirt.

These and other features of the present invention can be best understood from the following specification and drawings, the following of which is a brief description.

DETAILED DESCRIPTION OF THE PREFERRED EMBODIMENTS

Figure 1:
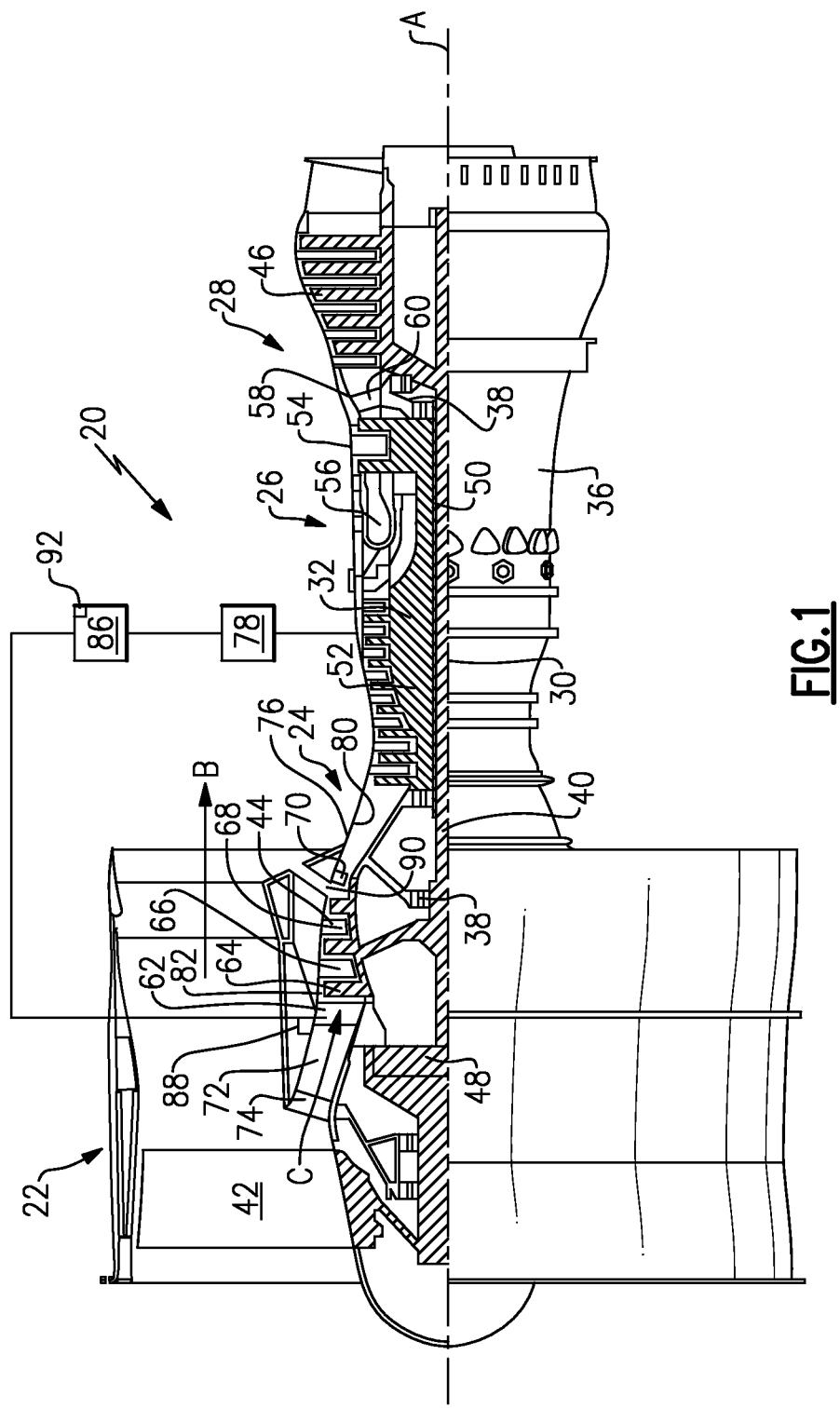
FIG. 1 shows a schematic view of a gas turbine engine.
Figure 2:
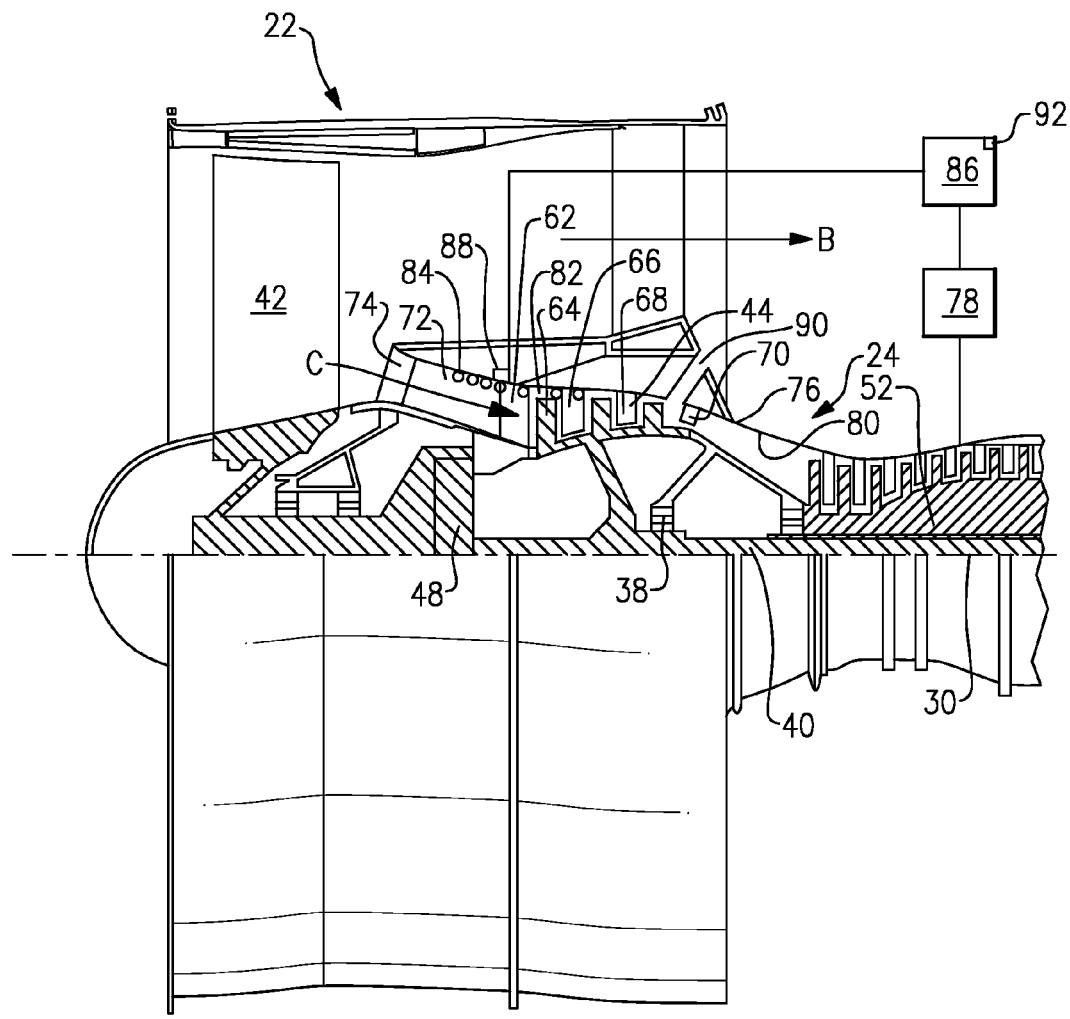
FIG. 2 shows a cut away cross-sectional view of the gas turbine engine with inlet vanes blocking particles during a specific flight condition.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features.

Although depicted as a geared turbofan gas turbine engine in the disclosed non-limiting embodiment, it should be understood that the concepts described herein are not limited to use with geared turbofans as the teachings may be applied to other types of turbine engines including three-spool or geared turbofan architectures.

The fan section 22 drives air along a bypass flowpath B while the compressor section 24 drives air along a core flowpath C for compression and communication into the combustor section 26 then expansion through the turbine section 28.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that interconnects a fan 42, a low pressure compressor 44 and a low pressure turbine 46. The inner shaft 40 is connected to the fan 42 through a geared architecture 48 to drive the fan 42 at a lower speed than the low speed spool 30. The geared architecture 48 connects the low pressure compressor 44 to the fan 42, but allows for rotation of the low pressure compressor 44 at a different speed and/or direction than the fan 42.

The high speed spool 32 includes an outer shaft 50 that interconnects a high pressure compressor 52 and a high pressure turbine 54.

A combustor 56 is arranged between the high pressure compressor 52 and the high pressure turbine 54.

A mid-turbine frame 58 of the engine static structure 36 is arranged generally between the high pressure turbine 54 and the low pressure turbine 46. The mid-turbine frame 58 further supports bearing systems 38 in the turbine section 28.

The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 58 includes airfoils 60 that are in the core airflow path. The turbines 46, 54 rotationally drive the respective low speed spool 30 and high speed spool 32 in response to the expansion.

The engine 20 is in one example a high-bypass geared aircraft engine. In a further example, the engine 20 bypass ratio is greater than about six (6:1) with an example embodiment being greater than ten (10:1). The geared architecture 48 is an epicyclic gear train (such as a planetary gear system or other gear system) with a gear reduction ratio of greater than about 2.3 (2.3:1). The low pressure turbine 46 has a pressure ratio that is greater than about five (5:1). The low pressure turbine 46 pressure ratio is pressure measured prior to inlet of low pressure turbine 46 as related to the pressure at the outlet of the low pressure turbine 46 prior to an exhaust nozzle.

In one disclosed embodiment, the engine 20 bypass ratio is greater than about ten (10:1), and the fan diameter is significantly larger than that of the low pressure compressor 44. The low pressure turbine 46 has a pressure ratio that is greater than about five (5:1). The geared architecture 48 may be an epicycle gear train, such as a planetary gear system or other gear system, with a gear reduction ratio of greater than about 2.5 (2.5:1). It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 feet, with the engine at its best fuel consumption, also known as bucket cruise Thrust Specific Fuel Consumption ("TSFC"). TSFC is the industry standard parameter of 1 bm of fuel being burned divided by 1 bf of thrust the engine produces at that minimum point.

"Fan pressure ratio" is the pressure ratio across the fan blade alone. The fan pressure ratio as disclosed herein according to one non-limiting embodiment is less than about 1.6.

"Low corrected fan tip speed" is the actual fan tip speed in feet per second divided by an industry standard temperature correction of $[(\text{Tambient deg R})/518.7)^{0.5}]$. The "Low corrected fan tip speed" as disclosed herein according to one non-limiting embodiment is less than about 1150 feet per second (351 meters per second).

Fan exit stators 74 are positioned between the fan 42 and the low pressure compressor 44, and air travels through the fan exit stators 74 to the low pressure compressor through a front center body duct 72. The front center body duct 72 can also have variable geometry.

The low pressure compressor 44 includes a plurality of vane stages. In one example, each of the stages can have variable geometry. In one example, the low pressure compressor 44 includes a plurality of variable inlet vanes 62 in a first stage, a plurality of vanes 66 in a second stage, a plurality of vanes 68 in a third stage, and a plurality of exit vanes 70 in a final stage. In one example, the plurality of exit vanes 70 have an inwardly sloping flowpath that connects the low pressure compressor 44 to the high pressure compressor 52. In one example, only the variable inlet vanes 62 are variable. However, it is possible that vanes 66, 68 and 70 in the other stages can be variable.

Figure 3:
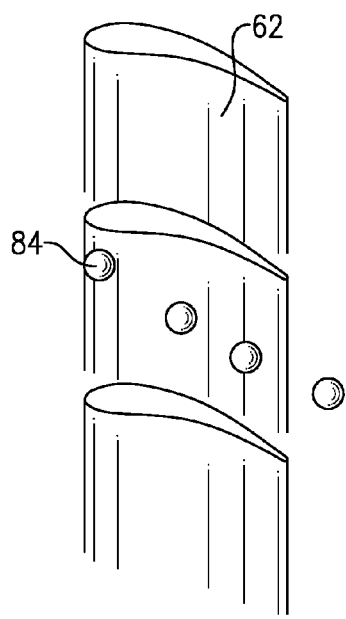
FIG. 3 shows a perspective view of a plurality of variable inlet vanes in a non-diversion position.
Figure 4:
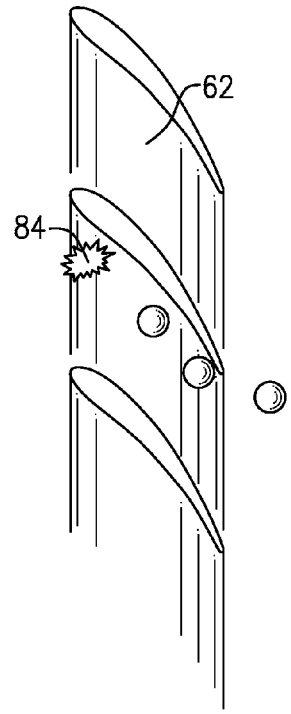
FIG. 4 shows a perspective view of a plurality of variable inlet vanes in a diversion position.
Figure 5:
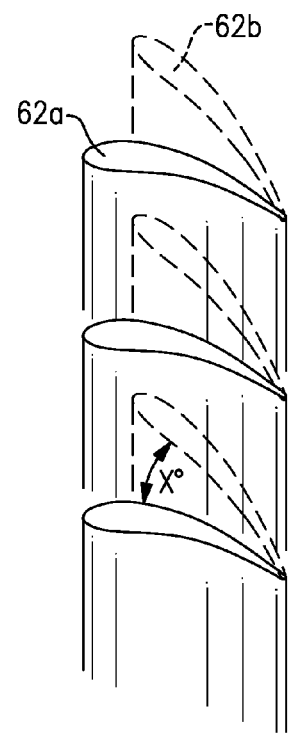
FIG. 5 shows a perspective view of the movement of the plurality of variable inlet vanes between the non-diversion position and the diversion position.

The variable inlet vanes 62 are linked and moveable between a non-diversion position (shown in FIG. 3) and a diversion position (shown in FIG. 4). FIG. 5 shows the movement of the vanes 62 between the non-diversion position 62a (shown in solid lines) and the diversion position 62b (shown in phantom lines). The non-diversion position 62a is a less obstructing position, and the diversion position 62b is a more obstructing position. In one example, the variable inlet vanes 62 move an angle X° between about 15° to about 50° from the non-diversion position 62a to the diversion position 62b. That is, the range of movement of the variable inlet vanes 62 is about 15° to about 50°. In one example, the variable inlet vanes 62 are moved to a diversion position 62b to protect the health of the gas turbine engine 20. The variable inlet vanes 62 are moved by an actuator 88. The actuator 88 may provide for moving the vanes 62 between the diversion position 62b and a non-diversion position 62a and a plurality of intermediate positions therebetween.

The low pressure compressor also includes a plurality of rotors or blades 64 between each of the stages of the vanes 62, 66, 68 and 70. An inner diameter of the plurality of rotors or blades 64 increases for successive stages of rotors 64 in the direction of airflow. In one example, an outer diameter of the rotors 64 through successive stages in the direction of airflow is nearly cylindrical. This defines a nearly annular flowpath 82 between the outer diameter of the rotors 64 and the outer casing 76.

A predetermined vane schedule 92 is programmed and stored in a controller 86 and associates vane 62 positions with predetermined flight conditions. The vane schedule 92 includes values and parameters that are pre-programmed in the controller 86 derived through analysis and testing. In one example, the programmed flight conditions are an altitude, a power setting, or both an altitude and a power setting. An altimeter 78 may determine the altitude of the gas turbine engine 20.

The controller 86 uses the predetermined vane schedule 92 to position the variable inlet vanes 62 as required by real time flight condition measurements. In one example, the vane schedule 92 is associated with operating characteristics of the low pressure compressor 44, as well as inclement weather operating parameters for the gas turbine engine 20. In one example, the vane schedule 92 is associated with operating characteristics of the low pressure compressor 44 in view of only the inclement weather operating parameters for the gas turbine engine 20. Inclement weather is defined as, or is a precursor to, hail, ice, rain or other environmental factors.

The controller 86 considers the programmed flight conditions of the vane schedule 92. The programmed flight conditions are established when the chances of encountering hail, ice, dirt, or other foreign objects increases. At these flight conditions, the angle of the variable inlet vanes 62 will be determined to meet the health of the overall gas turbine engine 20 instead of the optimum operability of the low pressure compressor 44.

In one example, inclement weather is most likely to affect engine operation during ascent and descent of the gas turbine engine 20. In one example, the chance of foreign objects 84 entering the gas turbine engine 20 increases when the gas turbine engine 20 is substantially at idle and the gas turbine engine 20 is at an altitude of 10,000 to 25,000 feet. In one example, the gas turbine engine 20 is idle when the low spool is operating at 30% to 70% of the design speed, or bucket cruise, condition.

At least one flight condition is monitored, determined and compared by the controller 86 to the vane schedule 92 that considers the programmed flight conditions that are pre-programmed in the controller 86. If the controller 86 determines that the programmed flight condition are met, the variable inlet vanes 62 are moved.

In one example, when the altimeter 78 detects that the altitude is between 10,000 and 25,000 feet, the gas turbine engine 20 is idle, or both the altitude is between 10,000 feet and 25,000 feet and the gas turbine engine 20 is idle, the programmed flight conditions are met. At these altitudes, the chance of hail, ice, dirt or other contaminants entering the gas turbine engine 20 increases.

When the programmed flight conditions are met, the controller 86 sends a signal to the actuator 88 to move the variable inlet vanes 62 to a diversion position to protect the engine 20. As shown in FIG. 4, when any hail, ice, dirt, foreign objects, or other particles 84 impinge on the variable inlet vanes 62, the flow of the direction of the particles 84 changes. The variable inlet vanes 62 deflect any hail, ice, dirt foreign objects, or other particles 84 to flow in the flowpath 82 between an inner surface 80 of an outer casing 76 of the gas turbine engine 20 and an outer diameter of the plurality rotors 64 for extraction with the downstream bleed through a duct 90.

In this example, the variable inlet vanes 62 are in the diversion position when the programmed flight conditions are met, regardless of the actual weather conditions. This is important as current control systems are not fast enough to determine the presence of a storm and to react if a storm occurs. In one example, the variable inlet vanes 62 move about 15° to about 50° from the non-diversion position to the diversion position. The exact amount the variable inlet vanes 62 move depends on several factors, among them engine size, engine operability, and the conditions of inclement weather determined by the flight conditions. The non-diversion position is a less obstructing position, and the diversion position is a more obstructing position.

FIG. 3 shows the variable inlet vanes 62 when in a non-diversion position. As compared to FIG. 4, the variable inlet vanes 62 are at a different angle than shown in FIG. 3. Any hail, ice, dirt, foreign objects, or other particles 84 flow in the variable inlet vanes 62. In this example, the hail, ice, dirt, foreign objects, or other particles would not impinge on the variable inlet vanes 62 and could travel inboard and into the low pressure compressor 44 and the high pressure compressor 52.

In another example, the altitude is 15,000 feet during an idle descent condition at a maximum aircraft indicated airspeed. At these conditions, the chances of encountering a hailstorm which could cause engine operational issues increases. In one example, the variable inlet vanes 62 moves about 30° from the non-diversion position to the diversion position.

The gas turbine engine 20 can operate during flight conditions that are more likely to expose the gas turbine engine 20 to the presence of hail, ice, dirt, foreign objects, or other particles without adverse responses from the gas turbine engine 20, optimizing the overall flight cycle.

Although a gas turbine engine 20 including geared architecture 48 is described, the vane schedule 92 can be employed with a gas turbine engine without a geared architecture.

The foregoing description is only exemplary of the principles of the invention. Many modifications and variations are possible in light of the above teachings, for instance, the inlet vanes may also have intermediate positions. It is, therefore, to be understood that within the scope of the appended claims, the invention may be practiced otherwise than using the example embodiments which have been specifically described. For that reason the following claims should be studied to determine the true scope and content of this invention.

What is claimed is:

1. A method of protecting a gas turbine engine, the method comprising the steps of:
   determining a flight condition of an aircraft;
   comparing the flight condition to a programmed condition; and
   moving a plurality of compressor vanes of a compressor between a first position and a second position for deflecting foreign objects if the step of comparing the flight condition to the programmed flight condition determines the programmed flight condition is met, wherein the compressor includes a plurality of rotors, and an outer flowpath is defined between an outer diameter of the plurality of rotors and an outer casing of a gas turbine engine, and the plurality of compressor vanes direct the foreign objects into the outer flowpath for extraction through a duct with a downstream bleed.

2. The method as recited in claim 1 wherein the first position is a non-diversion position and the second position is a diversion position.

3. The method as recited in claim 2 wherein the plurality of compressor vanes move between about 15° to about 50° from the non-diversion position to the diversion position.

4. The method as recited in claim 1 wherein the flight condition is an altitude.

5. The method as recited in claim 1 wherein the flight condition is a power setting.

6. The method as recited in claim 1 wherein the flight condition is an altitude and a power setting.

7. The method as recited in claim 1 further including the steps of generating a signal in response to the step of comparing the flight condition to the programmed flight condition, and moving the plurality of compressor vanes from the first position to the second position in response to the signal.

8. The method as recited in claim 1 wherein the programmed flight condition includes an altitude of 10,000 to 25,000 feet and a power condition of idle.

9. The method as recited in claim 1 wherein the foreign objects are at least one of hail, ice and dirt.

10. A method of protecting a gas turbine engine, the method comprising the steps of:
    selecting flight conditions of an aircraft including at least an altitude and a power setting;
    comparing the flight conditions to programmed flight conditions;
    generating a signal in response to the step of comparing the flight conditions to the programmed flight conditions if the programmed flight conditions are met; and
    moving a plurality of vanes of a compressor from a non-diversion position to a diversion position for deflecting any foreign objects in response to the signal, wherein, an outer diameter of a plurality of rotors of the compressor and an outer casing of a gas turbine engine define an outer flowpath and the diversion position of the plurality of compressor vanes deflects foreign objects into the outer flowpath for extraction through a duct with a downstream bleed.

11. The method as recited in claim 10 wherein the plurality of compressor, vanes move between about 15° to about 50° from the non-diversion position to the diversion position.

12. The method as recited in claim 10 wherein the programmed flight conditions include an altitude of about 10,000 to about 25,000 feet and a power condition substantially at idle.

13. The method as recited in claim 10 wherein the foreign objects are at least one of hail, ice and dirt.

14. A gas turbine engine comprising:
    a controller that determines flight conditions of an aircraft, compares the flight condition to a programmed flight condition, determines if the programmed flight condition is met, and generates a signal if the programmed flight condition is met; and
    a compressor including a plurality of compressor vanes constructed and arranged to move between a first position and a second position in response to the signal from the controller to deflect any foreign objects, wherein the compressor includes a plurality of rotors, and an outer flowpath is defined between an outer diameter of the plurality of rotors and an outer casing of a gas turbine engine, and the plurality of compressor vanes when in the second position direct the foreign objects into the outer flowpath for extraction through a duct with a downstream bleed.

15. The gas turbine engine as recited in claim 14 wherein the first position is a non-diversion position and the second position is a diversion position.

16. The gas turbine engine as recited in claim 15 wherein the plurality of compressor vanes move about 15° to about 50° from the respective non-diversion position to the diversion position.

17. The gas turbine engine as recited in claim 14 wherein the flight condition is an altitude.

18. The gas turbine engine as recited in claim 14 wherein the flight condition is a power setting.

19. The gas turbine engine as recited in claim 14 wherein flight condition is an altitude and a power setting.

20. The gas turbine engine as recited in claim 14 wherein the programmed flight condition includes an altitude of about 10,000 to about 25,000 feet and a power condition generally at idle.

21. The gas turbine engine as recited in claim 14 wherein an actuator moves the plurality of compressor vanes between the first position and the second position.

22. The gas turbine engine as recited in claim 14 wherein the foreign objects are at least one of hail, ice and dirt.

* * * * *